(12) United States Patent
Fukazawa et al.

(10) Patent No.: US 9,710,953 B2
(45) Date of Patent: Jul. 18, 2017

(54) APPARATUS, METHOD, AND PROGRAM FOR 3D DATA ANALYSIS, AND FINE PARTICLE ANALYSIS SYSTEM

(71) Applicant: Sony Corporation, Tokyo (JP)

(72) Inventors: Ryo Fukazawa, Kanagawa (JP); Shunsuke Suzuki, Kanagawa (JP); Atsuo Fujimaki, Tokyo (JP); Wataru Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 14/349,904

(22) PCT Filed: Oct. 5, 2012

(86) PCT No.: PCT/JP2012/006429
§ 371 (c)(1),
(2) Date: Apr. 4, 2014

(87) PCT Pub. No.: WO2013/054502
PCT Pub. Date: Apr. 18, 2013

(65) Prior Publication Data
US 2014/0240314 A1     Aug. 28, 2014

(30) Foreign Application Priority Data
Oct. 14, 2011    (JP) ................ 2011-226687

(51) Int. Cl.
| | | |
|---|---|---|
| H04N 13/02 | (2006.01) | |
| G06T 11/20 | (2006.01) | |
| G06T 15/00 | (2011.01) | |

(52) U.S. Cl.
CPC ............ G06T 15/00 (2013.01); G06T 11/206 (2013.01); H04N 13/0275 (2013.01)

(58) Field of Classification Search
None
See application file for complete search history.

(56) References Cited

U.S. PATENT DOCUMENTS

| | | |
|---|---|---|
| 2004/0218806 A1 | 11/2004 | Miyamoto et al. |
| 2006/0004541 A1 | 1/2006 | Miyamoto |

FOREIGN PATENT DOCUMENTS

| | | |
|---|---|---|
| JP | 2004-047939 | 2/2004 |
| JP | 2006-017497 | 1/2006 |

(Continued)

OTHER PUBLICATIONS

David R. Parks et al., "A New 'Logicle' Display Method Avoids Deceptive Effects of Logarithmic Scaling for Low Signals and Compensated Data," International Society for Analytical Cytology, Cytometry Part A, 69A:541-551 (2006). (11 pages).

(Continued)

*Primary Examiner* — Ryan M Gray
(74) *Attorney, Agent, or Firm* — K&L Gates LLP

(57) ABSTRACT

As a data analysis apparatus that can easily and intuitively identify fine particles and small fine particle populations to be analyzed in a distribution graph and that can obtain accurate statistical data regarding these, a 3D data analysis apparatus is provided that includes a data storage unit which saves measurement data regarding fine particles, an input unit which selects independent three types of variables from the measurement data, a data processing unit which calculates positions and figures in a coordinate space whose coordinate axes are the three types of variables and which creates a 3D stereoscopic image representing characteristic distribution of the fine particles, and a display unit which displays the 3D stereoscopic image and that displays, in the 3D stereoscopic image, the figures in each region of the coordinate space divided into a plurality of regions by a plane in a different color in each region.

8 Claims, 15 Drawing Sheets

(56) References Cited

FOREIGN PATENT DOCUMENTS

| | | |
|---|---|---|
| JP | 2011-145238 | 7/2011 |
| JP | 2011-203209 | 10/2011 |

OTHER PUBLICATIONS

John Altoft, "Data Visualization for ESM and ELINT: Visualizing 3D and Hyper Dimensional Data," Defence Research and Development, Ottawa (Ontario), Jun. 1, 2011. (84 pages).

Neil A Wells, "3D.BAS, A QuickBasic program for three-dimensional stereo-scatterplots of XYZ data," Computers & Geosciences, vol. 27, Issue 3, Apr. 2001, pp. 289-297. (9 pages).

Neil A Wells, "Display of Munsell color values, earthquakes, and other three- and four-parameter datasets in stereo 3D," Computers & Geosciences, vol. 28, Issue 5, Jun. 2002, pp. 701-709. (9 pages).

John Altoft, Abstract data from "Data Visualization for ESM and ELINT: Visualizing 3D and Hyper Dimensional Data," Defence Research and Development, Ottawa (Ontario), Jun. 1, 2011. (18 pages).

Nagel. H. R.: "Methods for Visual Mining of Data in Virtual Reality", Proceedings of the International Workshop on Visual Data Mining, Sep. 2001. (15 pages).

Office Action issued in CN application 201280049300.8, mailed Oct. 20, 2015 (21 pages).

Office Action issued in JP application 2011226687, mailed Dec. 22, 2015 (5 pages).

Mami Kaito, Visualization of Seismic-center Distribution for Earthquake Data Analysis, Technical Research Report of Institute of Electronics, Information and Communication Engineers, vol. 104, No. 390, Japan, Institute of Electronics, Information and Communication Engineers, Oct. 21, 2004, MVE2004-34, p. 19-24.

Chinese Office Action (with English translation) issued on Jun. 20, 2016 in corresponding Chinese application No. 2012800493008 (18 pages).

[Fig. 1]
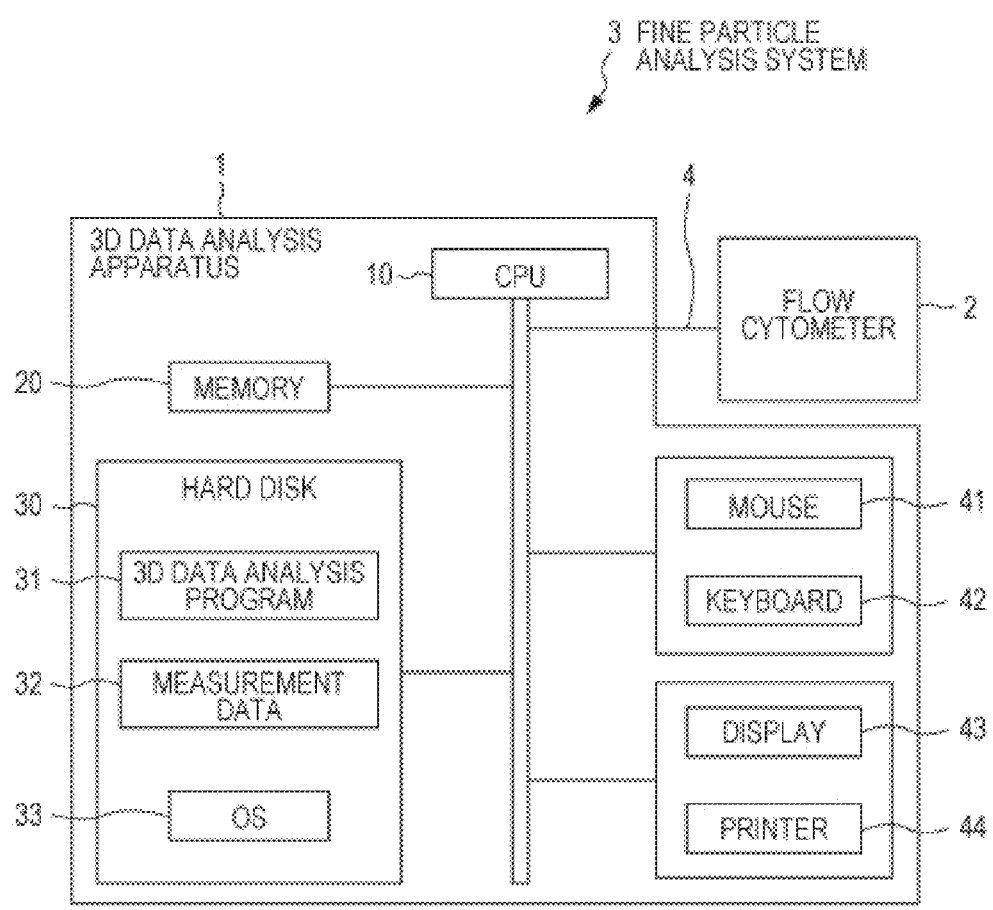

[Fig. 2]
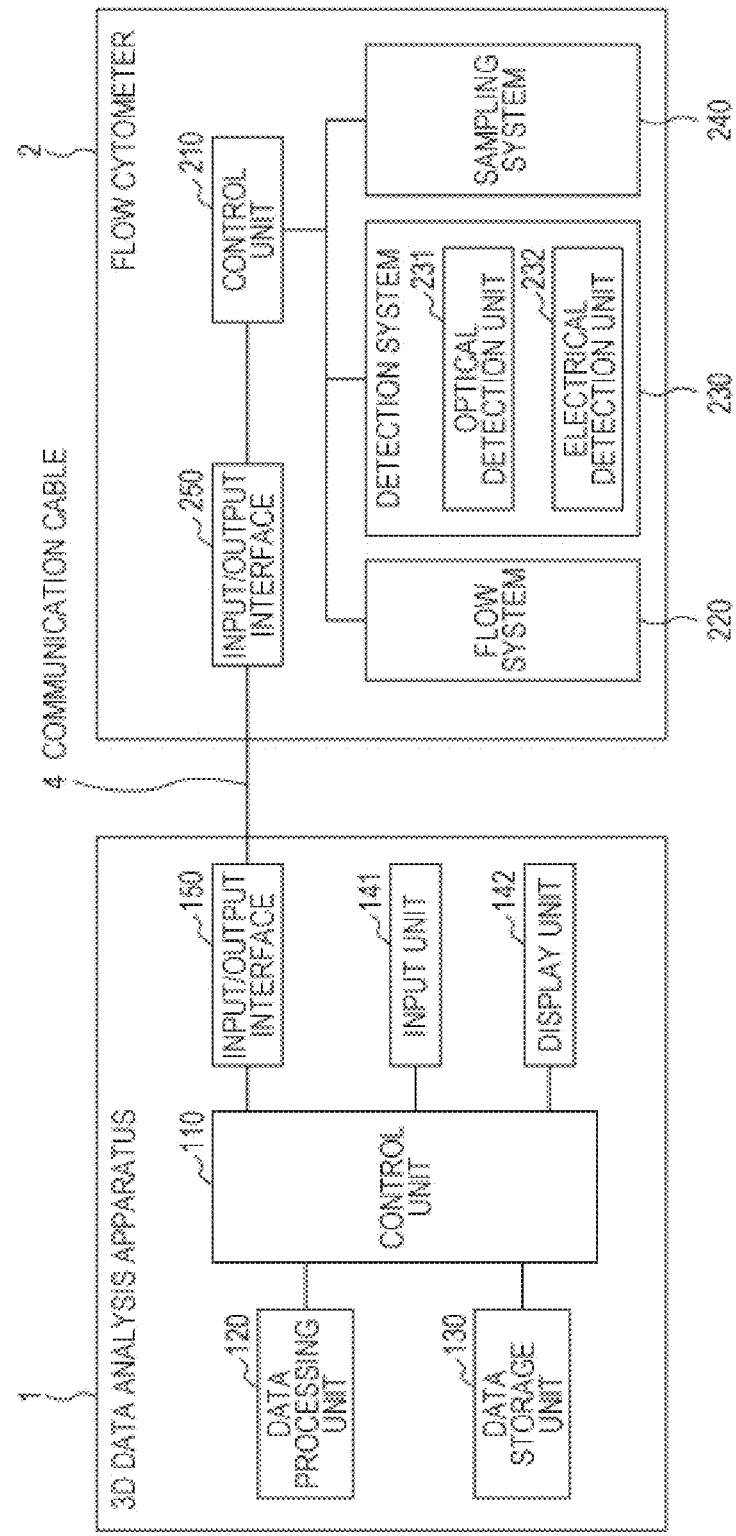

[Fig. 3]
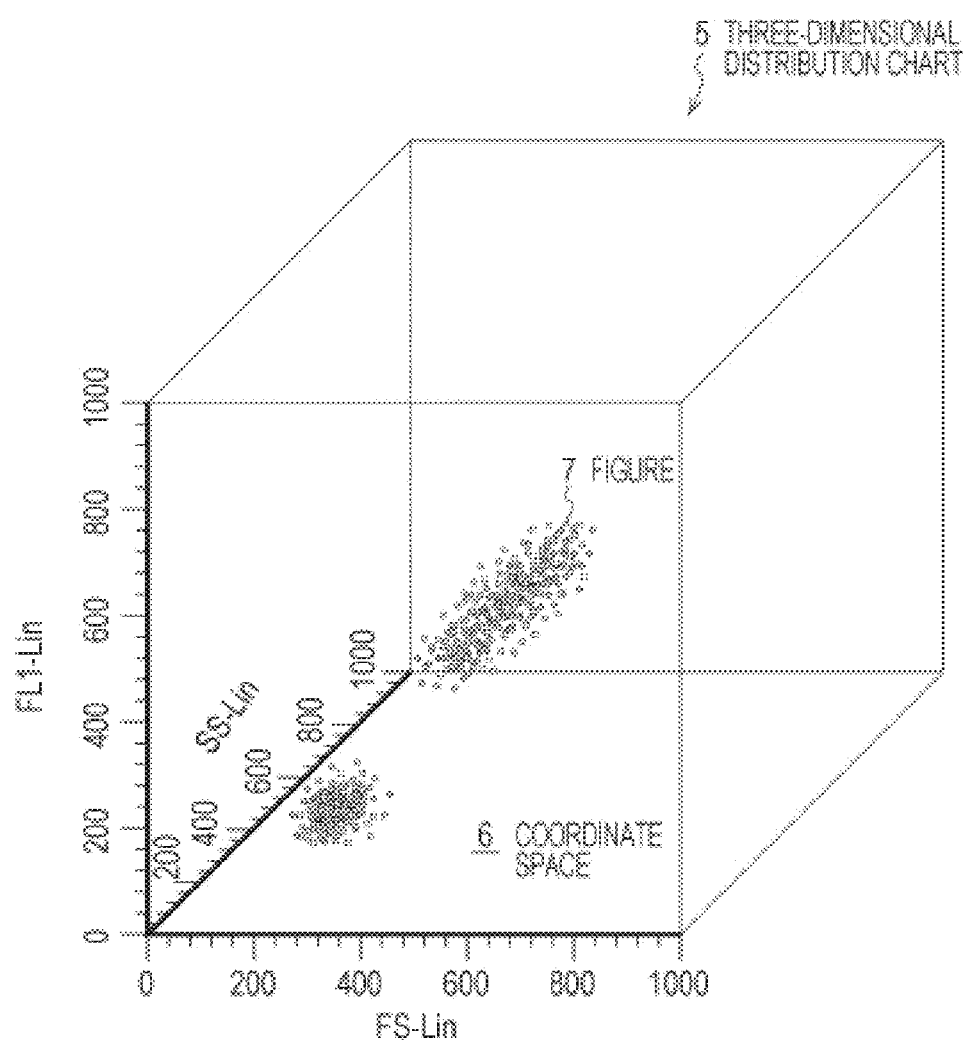

[Fig. 4]
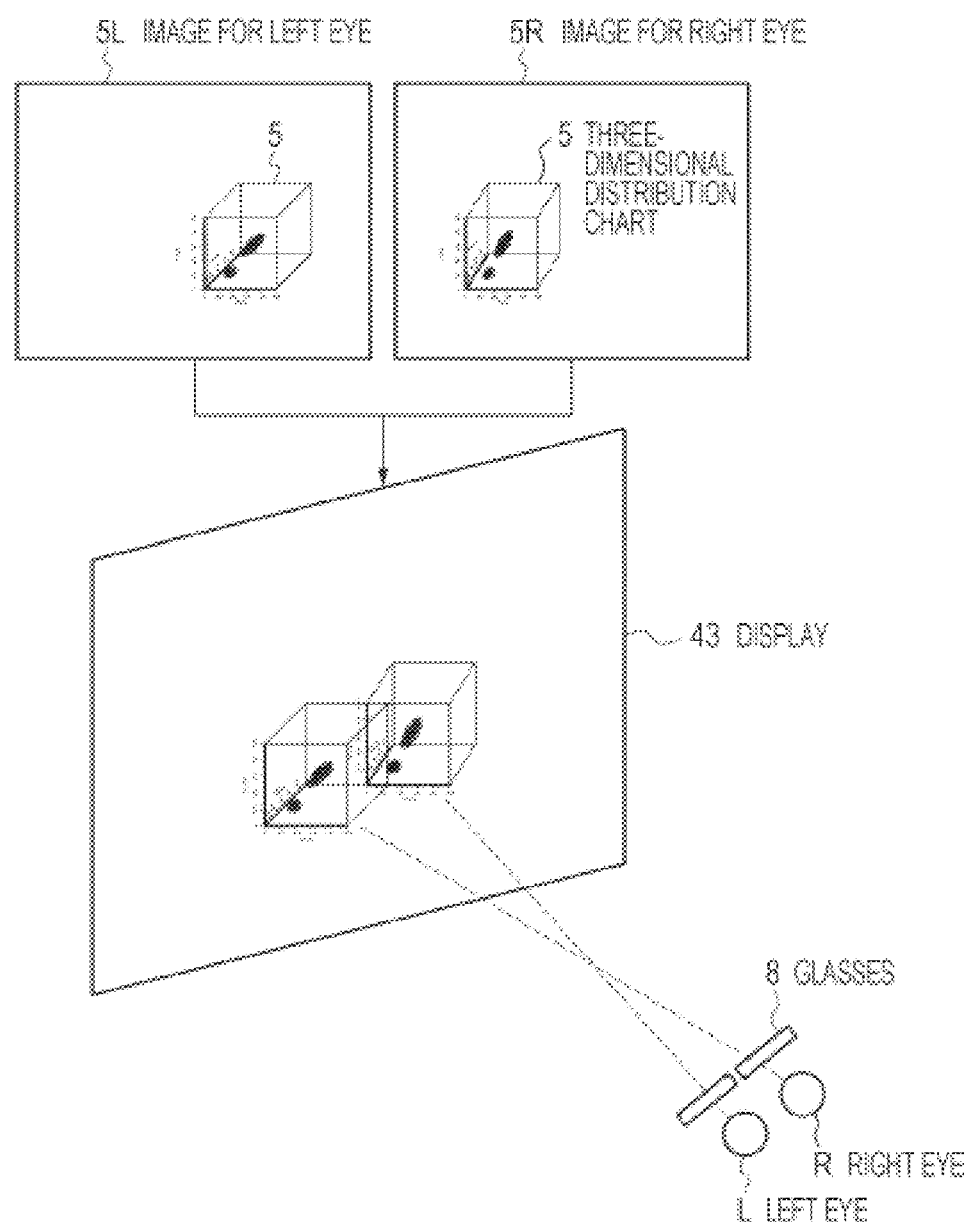

[Fig. 5]
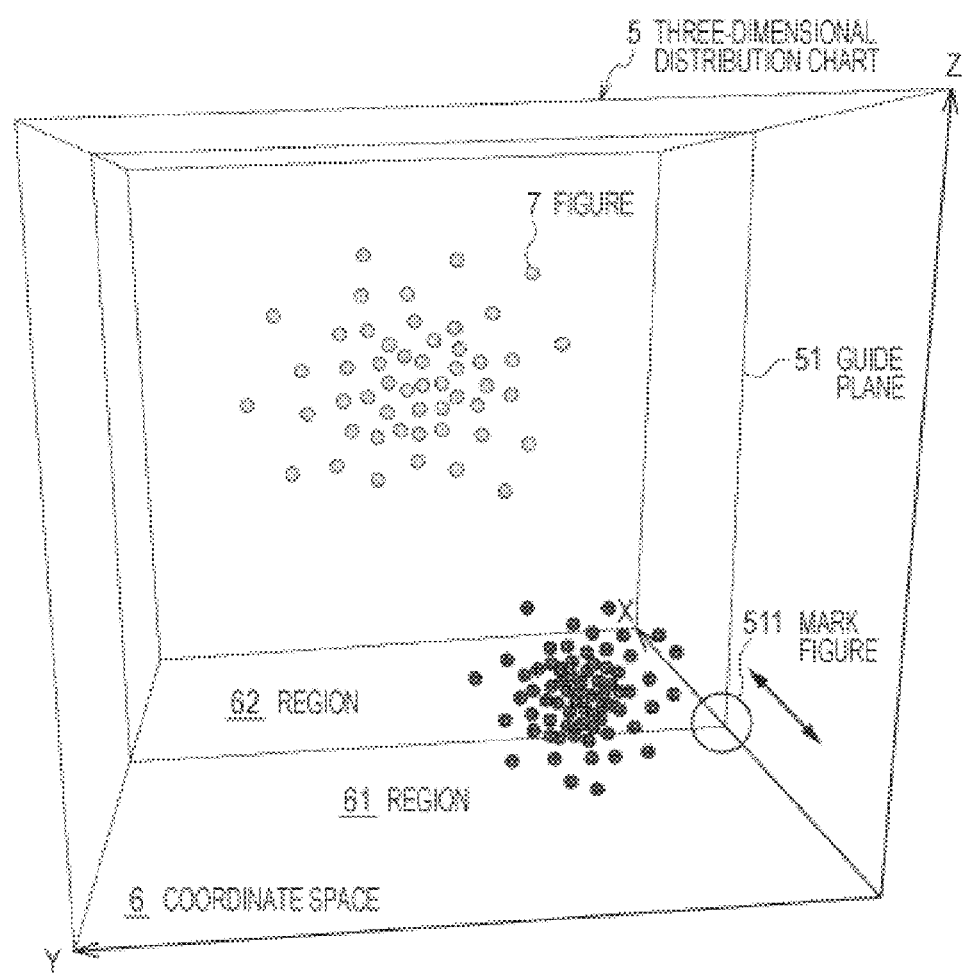

[Fig. 6]
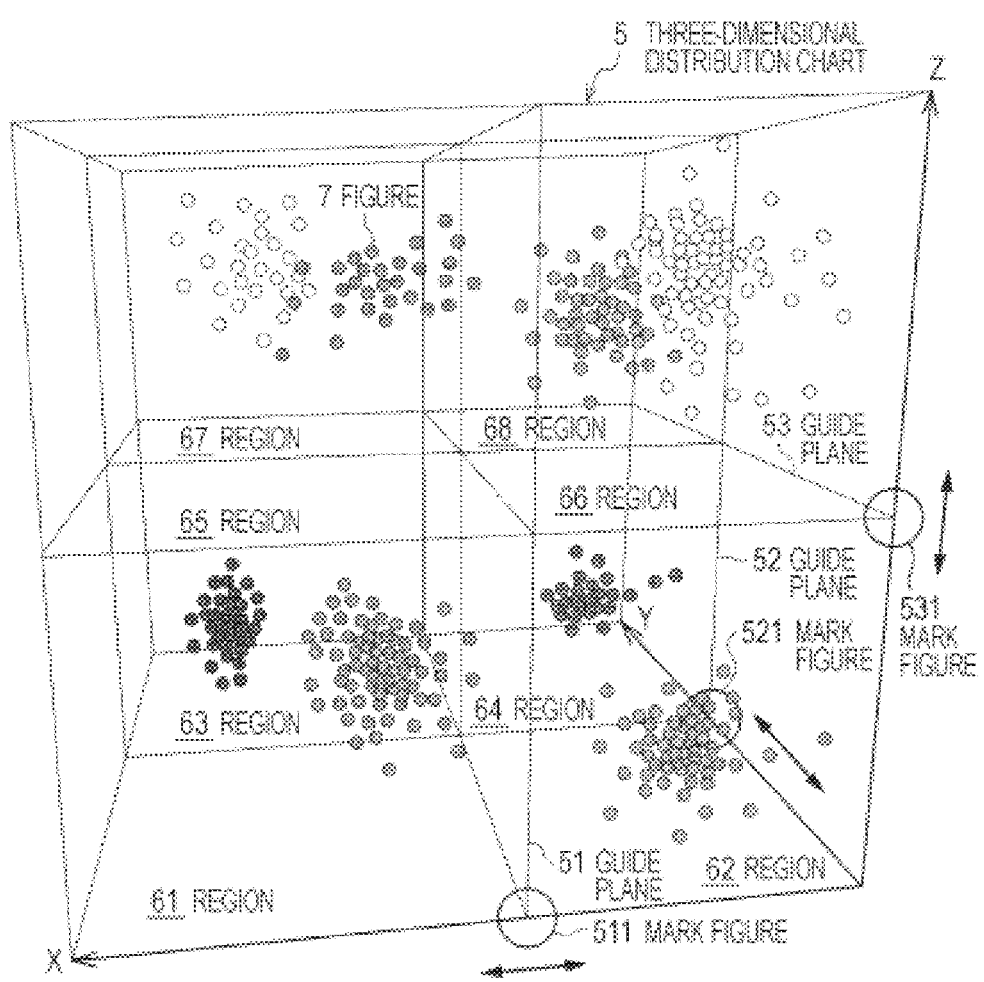

[Fig. 7]
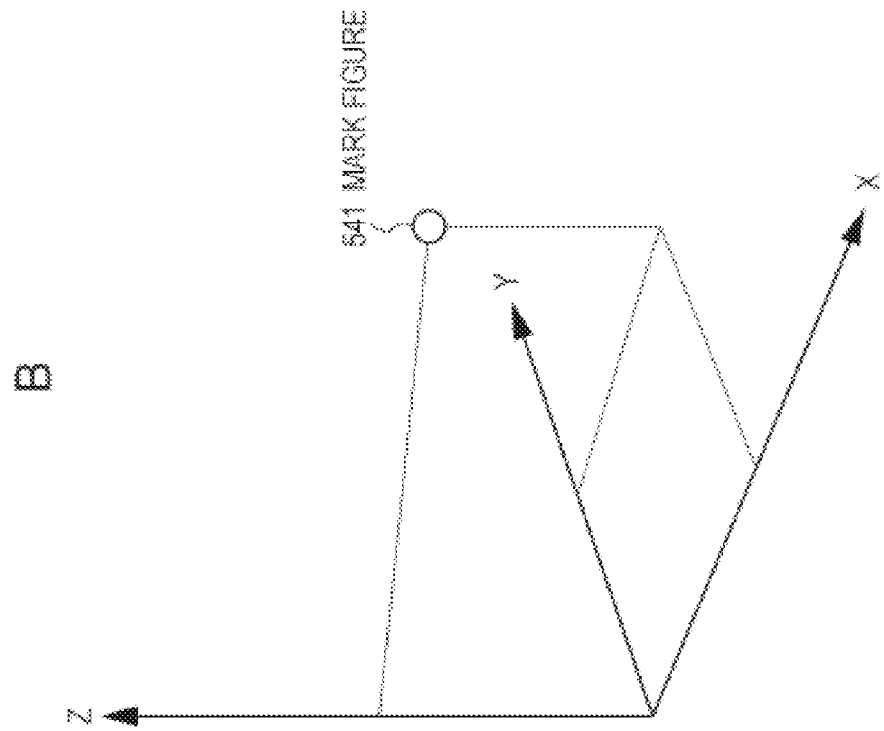
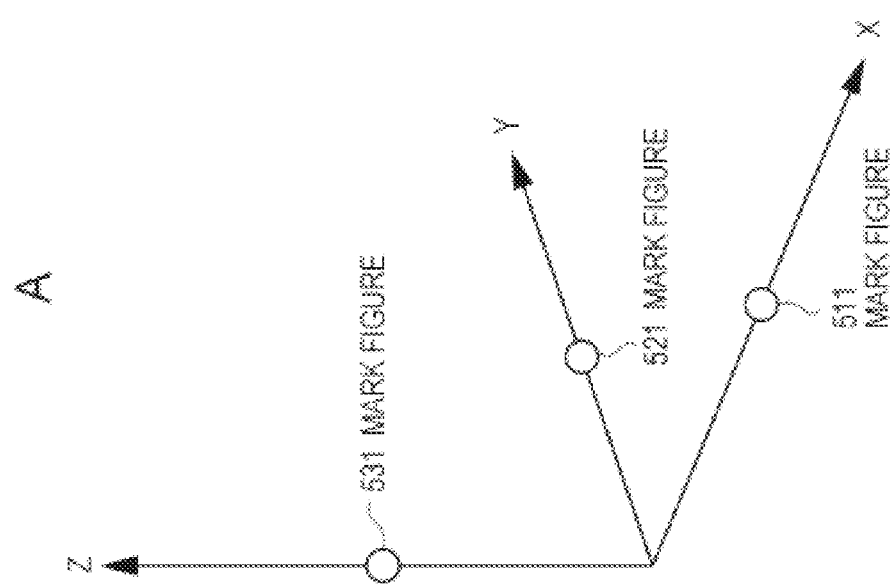

[Fig. 8]
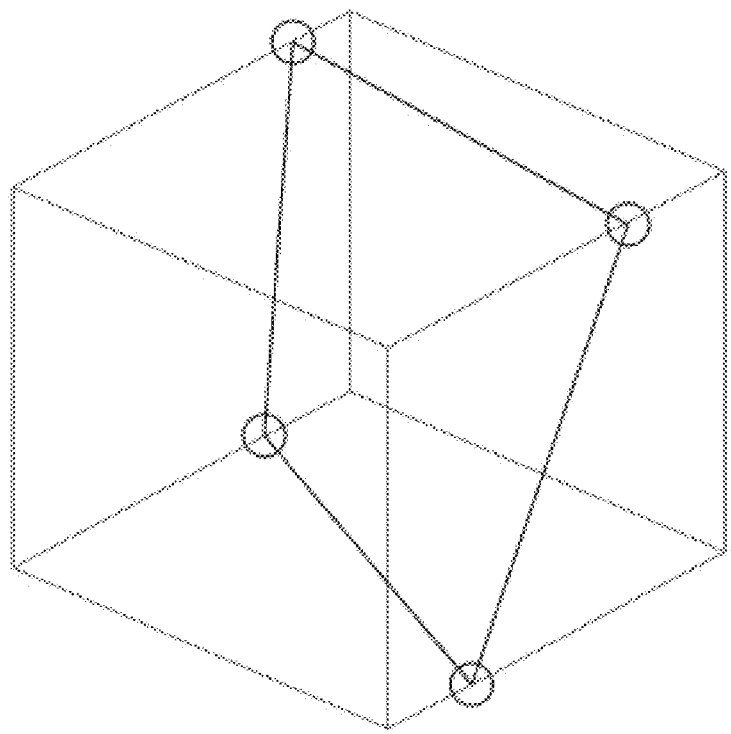
[Fig. 9]
Analysis Data
| FL1 | FL3 | FL5 | Data (%) | |
|---|---|---|---|---|
| − | − | − | 1.7% | |
| − | − | + | 0.6% | |
| − | + | − | 20.0% | |
| − | + | + | 7.7% | |
| + | − | − | 15.6% | |
| + | − | + | 15.5% | |
| + | + | − | 38.5% | |
| + | + | + | 0.4% | |

[Fig. 10]
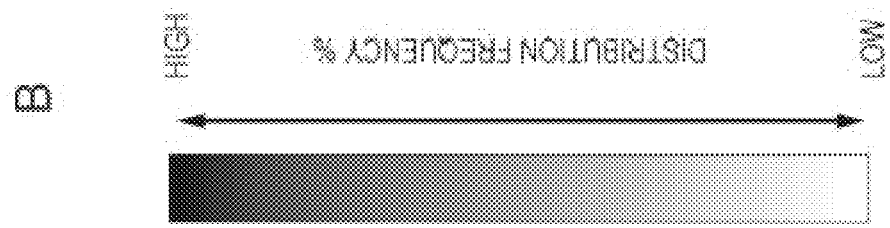
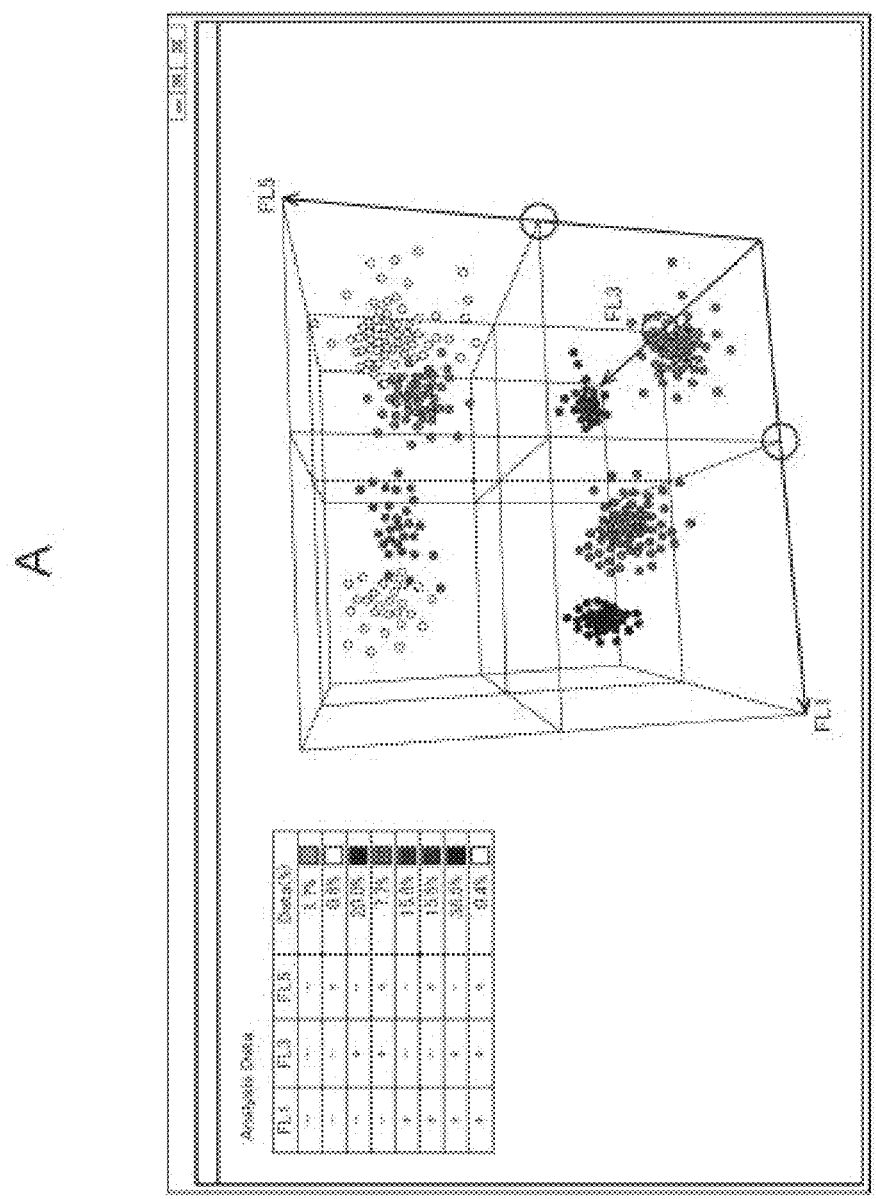

[Fig. 11]
A 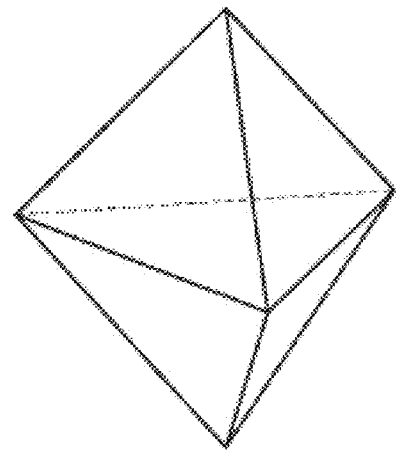
B 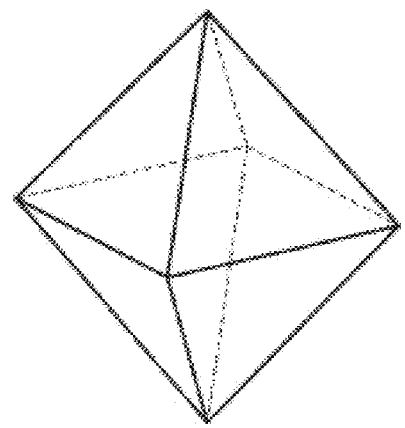

[Fig. 12]
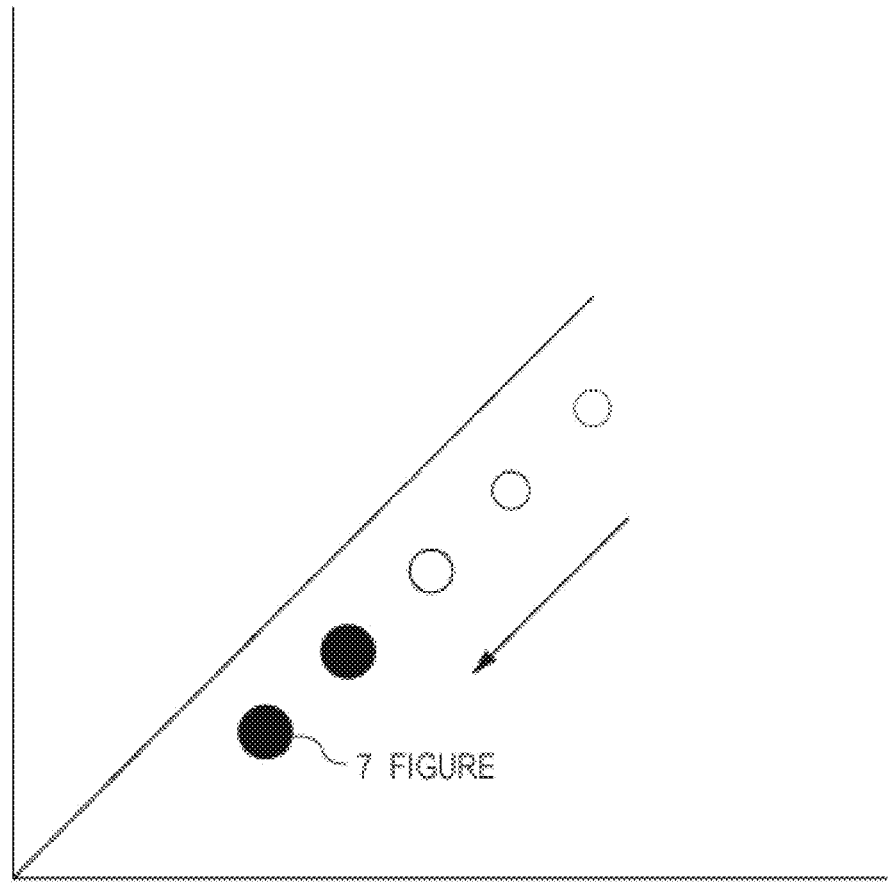

[Fig. 13]
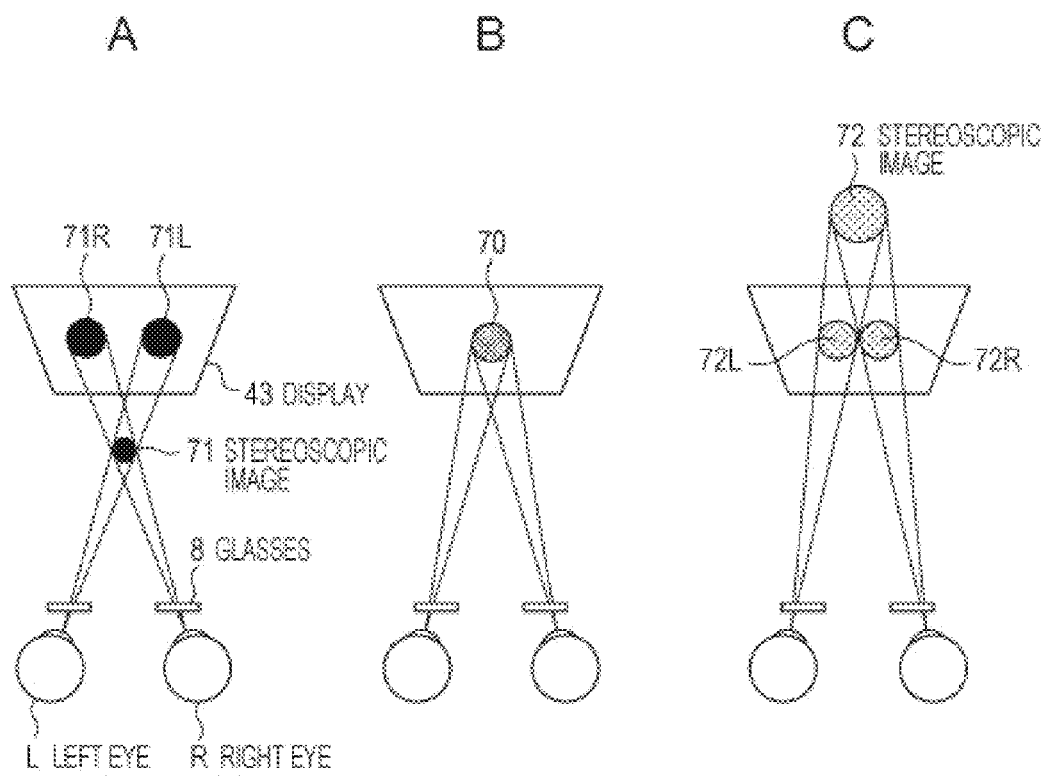

[Fig. 14]
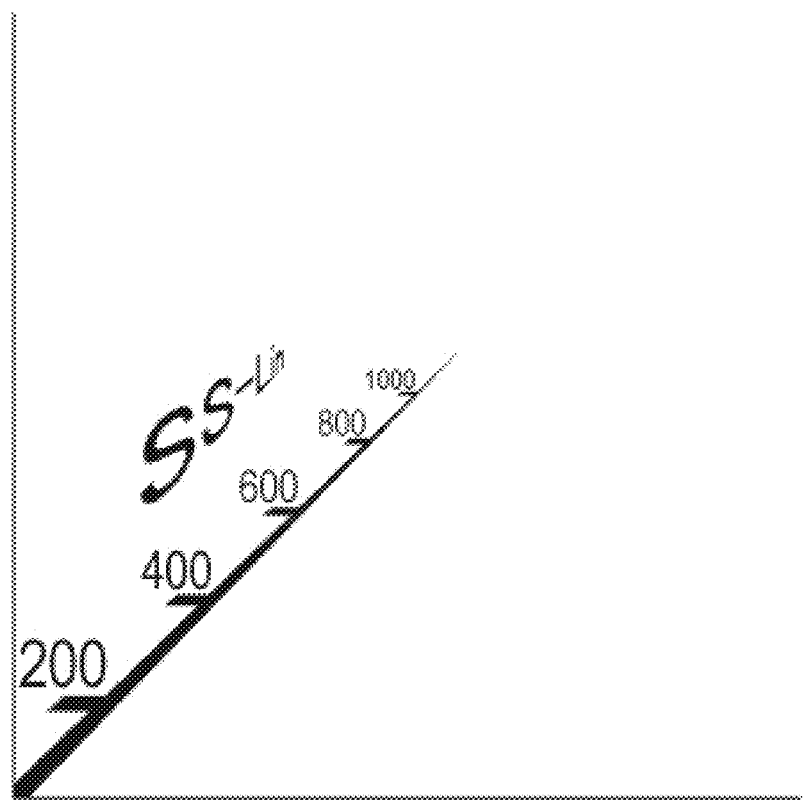

[Fig. 15]
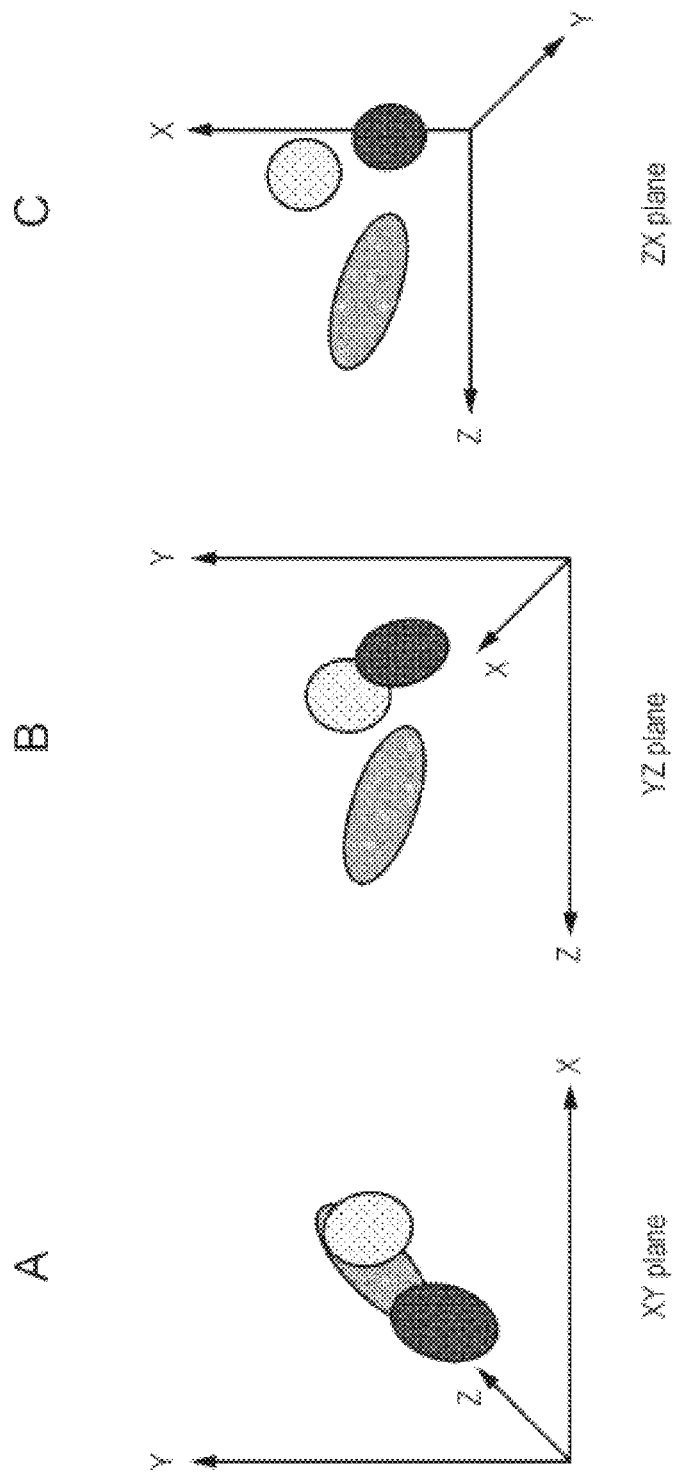

[Fig. 16]
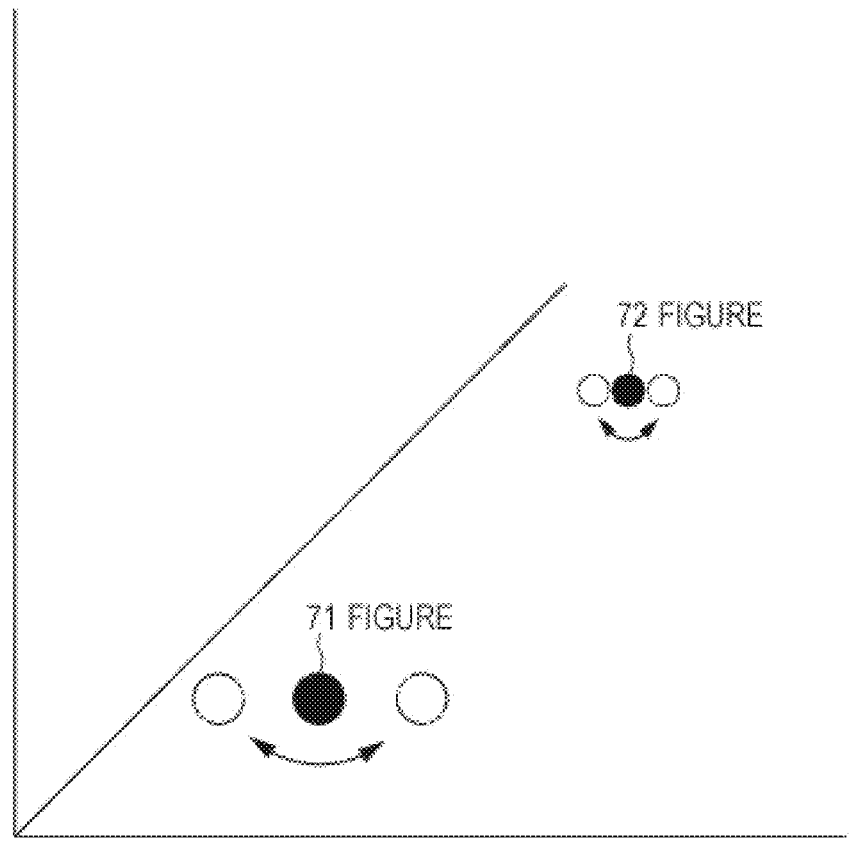

APPARATUS, METHOD, AND PROGRAM FOR 3D DATA ANALYSIS, AND FINE PARTICLE ANALYSIS SYSTEM

The present application is a national stage of International Application No. PCT/JP2012/006429 filed on Oct. 5, 2012 and claims priority to Japanese Patent Application No. 2011-226687 filed on Oct. 14, 2011, the disclosure of which is incorporated herein by reference.

BACKGROUND

The present technology relates to an apparatus, a method, and a program for a 3D data analysis, and a fine particle analysis system. More specifically, the present technology relates to a 3D data analysis apparatus or the like that can display measurement data regarding fine particles using a 3D stereoscopic image and that can perform a data analysis of population information or the like using the image.

A fine particle measuring apparatus is known that introduces dispersion liquid of fine particles into a flow passage and that optically, electrically, or magnetically measures the fine particles, in order to analyze the fine particles including biological particles such as cells, microorganisms, and liposomes and composite particles such as latex particles, gel particles, and industrial particles.

As an example, there is a particle analyzer that judges composite particles in accordance with the sizes and the shapes. Parameters (variables) that can be measured by the particle analyzer include the elemental composition and the particle diameters of fine particles.

In addition, a flow cytometer (flow cytometry) is used for an analysis of biological particles. Parameters that can be measured by the flow cytometer include the forward-scattered light (FS), the side scattering (SS), the fluorescence (FL), and the impedance of fine particles. The forward-scattered light (FS), the side scattering (SS), and the fluorescence (FL) are used as parameters indicating the optical characteristics of cells and microorganisms (hereinafter simply referred to as "cells") and the impedance is used as a parameter indicating the electrical characteristics of the cells.

More specifically, first, the forward-scattered light is light scattered at a small angle in a forward direction relative to an axis of laser light and composed of scattered light, diffracted light, and refracted light of the laser light generated on surfaces of cells. The forward-scattered light is mainly used as a parameter indicating the sizes of cells. Next, the side scattering is light scattered at an angle of about 90 degrees relative to the axis of the laser light and is scattered light of the laser light generated at granules and cores inside cells. The side scattering is mainly used as a parameter indicating the internal structures of cells. In addition, the fluorescence is light generated from a fluorochrome with which cells are labeled and is used as a parameter indicating whether or not there is a cell-surface antigen recognized by a fluorochrome-labeled antigen, the amount of nucleic acid with which a fluorochrome has been coupled, and the like. In addition, the impedance is measured by an electrical resistance method and used as a parameter indicating the volume of cells.

A data analysis apparatus is used that creates and displays a graph representing the characteristic distribution of cells in a cell population by plotting measured values of each cell while using these measurement parameters as axes in order to analyze measurement data of the flow cytometer. A one-dimensional distribution graph that uses one measurement parameter is also referred to as a histogram and created as a graph in which an X-axis represents the measurement parameter and a Y-axis represents the number of cells (count). In addition, a two-dimensional distribution graph that uses two measurement parameters is also referred to as a cytogram and created by plotting each cell in a coordinate plane in which one of the measurement parameters is represented by the X-axis and the other measurement parameter is represented by the Y-axis on the basis of its measured value.

By setting regions in a histogram or a cytogram, it is possible to obtain statistical data regarding cells existing in each region. As the statistical data, frequency distribution (population information) indicating the percentage of target cells included in a cell population is often used. The frequency distribution is calculated as the percentage of cells existing in each region set in the histogram or the cytogram relative to the entirety.

For example, when it is known that target cells indicate values equal to or larger than a certain value in a certain parameter, calculation of the distribution frequency of the target cells in a histogram is performed by dividing the histogram into two at the certain value along the X-axis. In doing so, the histogram is divided into a region (a region in which the target cells exist) equal to or larger than the certain value and a region (a region in which non-target cells exist) smaller than the certain value. With respect to each set region, the data analysis apparatus calculates the distribution frequency from the number of cells existing in each region. In addition, when a cytogram is used, calculation of the distribution frequency is performed by dividing the cytogram into four regions at certain values along the X-axis and the Y-axis. In doing so, the cytogram is divided into a region (a region in which the target cells exist) in which both the two parameters are equal to or larger than the certain values and regions (region in which non-target cells exist) in which either parameter is smaller than the certain value.

In PTL 1, "an analysis apparatus comprising measurement data obtaining means that obtains first, second, and third pieces of measurement data from an object to be analyzed, three-dimensional distribution graph creation means that creates a three-dimensional distribution graph indicating distribution of tangible components included in the object to be analyzed using the first, second, and third pieces of measurement data as axes, region setting means that sets a cut-off region in the three-dimensional distribution graph in such a way as to enable a change, and reference distribution graph creation means that creates at least either a two-dimensional distribution graph that uses the first and second pieces of measurement data as axes or a frequency distribution graph that uses the first piece of measurement data as an axis for tangible components belonging to the cut-off region set by the region setting means" is proposed (refer to Claim 9 of the literature). According to this analysis apparatus, a cut-off region can be set in a three-dimensional distribution graph while referring to a two-dimensional distribution graph (cytogram) and a frequency distribution graph (histogram) displayed together with the three-dimensional distribution graph. It is to be noted that the three-dimensional distribution graph of this analysis apparatus is displayed on a display in a planer manner and not viewed stereoscopically.

In relation to the present technology, a two-eye type stereo stereoscopic image technology (a 3D stereoscopic image technology) will be described. In the two-eye type stereo stereoscopic image, first, two images when an object is viewed by a right eye and a left eye are prepared. Next, while simultaneously displaying these images, an image for the right eye is presented only to the right eye and an image for the left eye is presented only to the left eye. In doing so, an image when the object is viewed in a three-dimensional space is reproduced and causes the user to stereoscopically view the object.

3D displays that enable stereoscopic vision mainly adopt (a) glasses methods, (b) naked eye methods, and (c) viewer methods. The (a) glasses methods further include anaglyph methods, polarizing filter methods, and time-division methods. In addition, the (b) naked eye methods include parallax barrier methods and lenticular methods, and the (c) viewer methods include stereoscope methods and head mount methods.

CITATION LIST

Patent Literature

[PTL 1] Japanese Unexamined Patent Application Publication No. 2006-17497

Non Patent Literature

[NPL 1] A New "Logicle" Display Method Avoids Deceptive Effects of Logarithmic Scaling for Low Signals and Compensated Data. Cytometry Part A 69A:541-551, 2006.

SUMMARY

Technical Problem

In a histogram that uses one measurement parameter as an axis or a cytogram that uses one combination between measurement parameters as axes, a small cell population to be analyzed and unnecessary cells might exist in regions that overlap each other. For example, when an analysis of lymphocytes is performed using human peripheral blood as a sample, some monocytes might exist in the same region as the lymphocytes in a cytogram that uses the forward-scattered light (FS) and the side scattering (SS) as axes.

Therefore, in an existing data analysis that uses a histogram or a cytogram, identification of target cells is difficult and it is difficult to set regions such that only the target cells exist, thereby making it impossible to accurately obtain the statistical data such as the frequency distribution.

Therefore, a main object of the present technology is to provide a data analysis apparatus that can easily and intuitively identify fine particles or small fine particle populations to be analyzed in a distribution graph and that can obtain accurate statistical data regarding these.

Solution to Problem

In order to solve the above problem, the present technology provides a 3D data analysis apparatus including a data storage unit that saves measurement data regarding fine particles an input unit that selects independent three types of variables from the measurement data, a data processing unit that calculates positions and figures in a coordinate space whose coordinate axes are the three types of variables and that creates a 3D stereoscopic image representing characteristic distribution of the fine particles, and a display unit that displays the 3D stereoscopic image. In the 3D stereoscopic image, the figures in each region of the coordinate space divided into a plurality of regions by a plane are displayed in a different color in each region.

In this 3D data analysis apparatus, when regions for a data analysis are to be set while stereoscopically viewing a three-dimensional distribution graph whose coordinate axes are the arbitrarily selected three types of parameters, the figures in each region are displayed in a different color in each region. Therefore, it is possible to set the regions while intuitively checking in which region each figure exists and accurately set the regions while clearly recognizing boundaries between the regions.

In this 3D data analysis apparatus, it is preferable that the data processing unit calculates the distribution frequency in each region and the display unit displays the figures in each region in a color associated with the distribution frequency. Furthermore, it is preferable that the data processing unit calculates the distribution frequency in synchronization with a change in the position of the plane and the color of the figures in each region is displayed in such a way as to change in real time.

By displaying the figures in each region of the 3D stereoscopic image in a different color according to the frequency distribution, the user can intuitively perceive results of an analysis of the frequency distribution.

It is preferable that the 3D data analysis apparatus is configured to be able to rotate the 3D stereoscopic image on the display unit on the basis of a signal input from the input unit and observe a stereoscopic image of the image from an arbitrarily selected coordinate axis direction.

In addition, the present technology provides a fine particle analysis system configured by providing a 3D data analysis apparatus that includes a data storage unit which saves measurement data regarding fine particles, an input unit which selects independent three types of variables from the measurement data, a data processing unit which calculates positions and figures in a coordinate space whose coordinate axes are the three types of variables and which creates a 3D stereoscopic image representing characteristic distribution of the fine particles, and a display unit which displays the 3D stereoscopic image and that displays, in the 3D stereoscopic image, the figures in each region of the coordinate space divided into a plurality of regions by a plane in a different color in each region and a fine particle measuring apparatus in combination with each other.

Furthermore, the present technology provides a 3D data analysis method including a procedure for selecting independent three types of variables from measurement data regarding fine particles, a procedure for calculating positions and figures in a coordinate space whose coordinate axes are the three types of variables and creating a 3D stereoscopic image representing characteristic distribution of the fine particles, a procedure for displaying the 3D stereoscopic image, a procedure for setting a plane that divides the coordinate space into a plurality of regions in the 3D stereoscopic image, and a procedure for displaying the figures in each region in a different color in each region. In addition, a 3D data analysis program is also provided that causes a computer to execute a step of calculating positions and figures in a coordinate space whose coordinate axes are independent three types of variables selected from measurement data regarding fine particles and creating a 3D stereoscopic image representing characteristic distribution of the fine particles, a step of displaying the 3D stereoscopic image, and a step of displaying, in the 3D stereoscopic image, the figures in each region of the coordinate space divided into a plurality of regions by a plane set by a user in a different color in each region.

In the present technology, "fine particles" are assumed to widely include fine particles including biological particles such as cells, microorganisms, and liposomes and composite particles such as latex particles, gel particles, and industrial particles.

The cells include animal cells (blood cell-related cells and the like) and plant cells. The microorganisms include bacteria such as colon bacilli, viruses such as tobacco mosaic viruses, and fungi such as yeast fungi. The biological particles also include chromosomes, liposomes, mitochondria, organelles. Furthermore, the biological particles can also include nucleic acids, proteins, and biological macromolecules such as composites of these. The industrial particles may be organic or inorganic macromolecular materials, metals, and the like. The organic macromolecular materials include polystyrene, styrene-divinylbenzene, and polymethylmethacrylate. The inorganic macromolecular materials include glass, silica, and magnetic materials. The metals include colloidal gold and aluminum. The shapes of these fine particles are generally spherical, but may be non-spherical. In addition, the sizes and the mass of fine particles are not particularly limited.

Advantageous Effects of Invention

According to the present invention, a data analysis apparatus is provided that can easily and intuitively identify fine particles or small fine particle populations to be analyzed in a distribution graph and that can obtain accurate statistical data regarding these.

Additional features and advantages are described herein, and will be apparent from the following Detailed Description and the figures.

BRIEF DESCRIPTION OF THE FIGURES

FIG. 1 is a block diagram illustrating the configuration of a 3D data analysis apparatus according to the present technology provided in combination with a flow cytometer.

FIG. 2 is a block diagram illustrating the functional configuration of the 3D data analysis apparatus according to the present technology.

FIG. 3 is a schematic diagram illustrating a three-dimensional distribution graph displayed by the 3D data analysis apparatus according to the present technology.

FIG. 4 is a schematic diagram illustrating a two-eye type stereo stereoscopic image (a 3D stereoscopic image) displayed by the 3D data analysis apparatus according to the present technology.

FIG. 5 is a schematic diagram illustrating a plane (a guide plane) and regions set in a coordinate space of a three-dimensional distribution graph.

FIG. 6 is a schematic diagram for illustrating a three-dimensional distribution graph in which the coordinate space has been divided into eight regions.

FIGS. 7A and 7B are schematic diagrams for illustrating the arrangement of mark figures for moving guide planes that divides the coordinate space of the three-dimensional distribution graph into the eight regions.

FIG. 8 is a schematic diagram for illustrating a guide plane set in the coordinate space of the three-dimensional distribution graph in an inclined manner.

FIG. 9 is a diagram for illustrating a display example of results of an analysis of frequency distribution in the three-dimensional distribution graph in which the coordinate space has been divided into the eight regions.

FIGS. 10A and 10B are schematic diagrams for illustrating a three-dimensional distribution graph in which multi-color display is performed while reflecting a distribution frequency.

FIGS. 11A and 11B are schematic diagrams illustrating the shapes of figures corresponding to fine particles in a three-dimensional image.

FIG. 12 is a conceptual diagram illustrating a stereoscopically observed image of figures subjected to a shading process.

FIGS. 13A through 13C a are schematic diagrams illustrating a processing method of the shading process.

FIG. 14 is a conceptual diagram illustrating a stereoscopically observed image of a coordinate axis.

FIGS. 15A through 15C are conceptual diagrams illustrating an image of a three-dimensional distribution graph stereoscopically observed from each coordinate axis direction.

FIG. 16 is a conceptual diagram illustrating a stereoscopically observed image of a moving image in which figures corresponding to fine particles are caused to vibrate.

DETAILED DESCRIPTION

A preferable embodiment for implementing the present technology will be described hereinafter with reference to the drawings. It is to be noted that the embodiment described hereinafter presents an example of a representative embodiment of the present technology, and the scope of the present technology is not narrowly interpreted thereby. The description follows the following order.

1. Configuration of 3D Data Analysis Apparatus
2. Display of 3D Stereoscopic Image
3. Data Analysis
4. Data Display
5. Characteristics of 3D Stereoscopic Image
(5-1) Shape of Figures
(5-2) Shading Process for Figures
(5-3) Coordinate Axis
(5-4) Moving Image
6. 3D Data Analysis Program
1. Configuration of 3D Data Analysis Apparatus FIG. 1 illustrates the apparatus configuration of a 3D data analysis apparatus according to the present technology. Here, an embodiment in which the 3D data analysis apparatus is provided in combination with a fine particle measuring apparatus as a fine particle analysis system will be described. In addition, FIG. 2 illustrates the functional configuration of this fine particle analysis system. A case in which a flow cytometer is used as the fine particle measuring apparatus will be described hereinafter as an example.

A 3D data analysis apparatus indicated by a code 1 in the figure is connected to a flow cytometer 2 through a communication cable 4 to configure a fine particle analysis system 3. The 3D data analysis apparatus 1 includes a central processing unit (CPU) 10, a memory 20, a hard disk 30, user interfaces, and the like. The hard disk 30 stores or holds a 3D data analysis program 31, measurement data 32 regarding fine particles, an operating system (OS) 33, and the like. The user interfaces include a mouse 41 and a keyboard 42 that receive information input from a user and a display 43 and a printer 44 that output information to the user. It is to be noted that, instead of, or in addition to, the mouse 41 and the keyboard 42, input devices such as a stick controller and a pen tablet may be provided.

A data storage unit 130 (the hard disk 30) saves the measurement data 32 regarding fine particles (cells) output from the flow cytometer 2. Measurement data output from an input/output interface 250 of the flow cytometer 2 is input to an input/output interface 150 of the 3D data analysis apparatus 1 through the communication cable 4 and stored in the data storage unit 130 (the hard disk 30).

The measurement data 32 is processed in a data processing unit 120. Upon receiving an input from the user through an input unit 141 (the mouse 41, the keyboard 42, or the like), the data processing unit 120 begins the processing. That is, when independent three types of variables (parameters) have been selected from the measurement data 32 by the user and input, the data processing unit 120 creates a three-dimensional distribution graph representing the characteristic distribution of fine particles using the selected parameters as coordinate axes. The three-dimensional distribution graph is created by plotting the fine particles in a coordinate space whose coordinate axes are the selected parameters. The plotting of the fine particles is performed by calculating the position and the figure of each fine particle in the coordinate space on the basis of measured values of the selected parameters and by drawing the calculated figure at the calculated position.

Here, the "independent parameters" refer to parameters that are different from one another selected from among forward-scattered light (FS), side scattering (SS), fluorescence (FL), and impedance of the fine particles and the like. The fluorescence (FL) can be treated as a parameter that is different between the wavelength ranges of a fluorochrome with which the fine particles are labeled, and denoted by FL1 and FL2 to FLn (n is an integer equal to or larger than 3) or the like. As the independent three types of parameters, for example, a combination between the forward-scattered light (FS), the side scattering (SS), and the fluorescence (FL1) or a combination between the forward-scattered light (FS), the side scattering (SS), and the impedance may be used as an example. Alternatively, the independent three types of parameters may be arbitrarily selected from the measurement data and combined.

The three-dimensional distribution graph created by the data processing unit 120 is displayed on a display unit 142 (the display 43) as a 3D stereoscopic image. The number of 3D stereoscopic images displayed on the display unit 142 may be one, two, or more. When two or more 3D stereoscopic images are to be displayed, 3D stereoscopic images obtained by observing the same three-dimensional distribution graph from a plurality of different directions or 3D stereoscopic images of a plurality of three-dimensional distribution graphs, in each of which at least one of the selected three types of parameters is different, may be displayed. The 3D stereoscopic image here is a two-eye type stereo stereoscopic image.

Furthermore, when the measurement data 32 includes measured values at a plurality of different times (time points), the display unit 142 may display three-dimensional distribution graphs representing the characteristic distribution of fine particles at the plurality of time points using 3D stereoscopic images. The measurement data including measured values at a plurality of time points may be, for example, data obtained by measuring association or dissociation of a cell-surface molecular complex over time using a fluorescence resonance energy transfer (FRET) method, data obtained by measuring changes in a cell membrane over time using a fluorochrome whose fluorescence wavelength changes in accordance with the charge of the cell membrane, data obtained by measuring the expression intensity of cell-surface molecules while correlating the frequency expression with the influx response of intracellular calcium, or the like.

The 3D stereoscopic images of the three-dimensional distribution graphs at the plurality of time points may be displayed side by side at once or may be displayed one by one while switching the display. When the display switching of the 3D stereoscopic images is performed, the switching may be automatically performed or may be performed on the basis of a signal input by the user. By displaying the 3D stereoscopic images of the three-dimensional distribution graphs at the plurality of time points, the user can perform a data analysis while checking sequential changes in the characteristic distribution of the fine particles, and it is possible to perform a more multidimensional analysis in which time (a time axis) has been added to the three types of parameters (coordinate axes).

The display of a 3D stereoscopic image on the display unit 142 may be performed while arbitrarily rotating, enlarging, or reducing the 3D stereoscopic image on the basis of a signal input by the user through the input unit 141 (the mouse 41, the keyboard 42, or the like). In addition, when a cut-off region for gating or an analysis region for a data analysis, which will be described later, is set in the coordinate space of the three-dimensional distribution graph on the basis of a signal input from the input unit 141, the 3D stereoscopic image is rotated, enlarged, or reduced together with a solid figure indicating the cut-off region or the analysis region displayed in the image.

The flow cytometer 2 may have the same configuration as an existing known apparatus or a configuration obtained by modifying this as necessary and, more specifically, is configured by a control unit 210, a flow system 220, a detection system 230, the input/output interface 250, and the like.

The flow system 220 flows a sample liquid layer flow including fine particles into the center of a sheath liquid layer flow in a flow passage formed in a flow cell or a microchip, and the fine particles are arranged in a line in the layer flow. The detection system 230 obtains parameter values indicating the characteristics of the fine particles flowing through the flow passage. More specifically, an optical detection unit 231 radiates light onto the flowing fine particles, detects scattered light, luminescence, or the like generated from the fine particles, and obtains the intensity. The optical detection unit 231 is configured by including a laser light source, a lens, a mirror, a filter, an area image pickup device such as a CCD or CMOS device or a PMT (photo multiplier tube), and the like. In addition, an electrical detection unit 232 is configured by including electrodes provided in such a way as to face the flowing fine particles, and obtains the impedance, the capacitance, and the inductance of the fine particles and the like. The flow cytometer 2 may include a sampling system 240 for sampling fine particles that have been judged to have desired characteristics as a result of an analysis. The sampling system 240 may adopt, for example, a method in which only desired fine particles are collected in a vessel by discharging a drop including fine particles to a space outside a flow cell and by controlling the movement direction of the drop.

Measured values of the intensity of the scattered light, the luminescence, and the like detected by the detection system 230 or measured values of the impedance, the capacitance, the inductance, and the like are converted into electrical signals and output from the input/output interface 250 as measurement data.

2. Display of 3D Stereoscopic Image

FIG. 3 schematically illustrates a three-dimensional distribution graph displayed by the 3D data analysis apparatus according to the present technology. The three-dimensional distribution graph is displayed on the display unit 142 using a 3D stereoscopic image and can be stereoscopically recognized by the user.

A three-dimensional distribution graph 5 represents the characteristic distribution of fine particles in a coordinate space 6 whose coordinate axes are the three types of parameters selected by the user. In the three-dimensional distribution graph 5, a figure 7 corresponding to each fine particle is drawn at a position calculated from the measured values of the selected parameters.

In the figure, a case in which the three types of parameters are a combination between forward-scattered light (FS-Lin: X-axis), side scattering (SS-Lin: Y-axis), and a first luminescence (FL1-Lin: Z-axis) is illustrated as an example. The parameters represented by the coordinate axes may be an arbitrarily selected combination. For example, the X-axis may represent the first luminescence (FL1), the Y-axis may represent a second luminescence (FL2), and the Z-axis may represent the impedance.

The 3D stereoscopic display of the three-dimensional distribution graph 5 is performed using a two-eye type stereo stereoscopic image. FIG. 4 schematically illustrates a two-eye type stereo stereoscopic image displayed by the 3D data analysis apparatus according to the present technology.

When the user has selected parameters, the data processing unit 120 creates the three-dimensional distribution graph 5 and creates an image (an image 5L for a left eye) at a time when the distribution graph is viewed by the left eye and an image (an image 5R for a right eye) at a time when the distribution graph is viewed by the right eye. The display unit 142 (the display 43) simultaneously displays the image 5L for the left eye and the image 5R for the right eye and separately presents the image 5L for the left eye only for the left eye and the image 5R for the right eye only for the right eye.

For example, in a time-division method, which is a one of glasses methods, the separate presentation can be performed by alternately displaying the image 5L for the left eye and the image 5R for the right eye in a slight time difference and by synchronizing shutter glasses 8 with this. Alternatively, the separate presentation may adopt another glasses method such as an anaglyph method or a polarizing filter method, a naked eye method such as a parallax barrier method or a lenticular method, or a viewer method such as a stereoscope method or a head mount method.

The display 43 reproduces an image at a time when the three-dimensional distribution graph is seen by the eyes in the three-dimensional space by separately presenting the image 5L for the left eye and the image 5R for the right eye, in order to cause the user to stereoscopically view the distribution graph.

3. Data Analysis

The setting of an analysis region for a data analysis is performed by the user by setting a plane that divides the coordinate space 6 of the three-dimensional distribution graph 5 into a plurality of regions using an input device such as the mouse 41 or the keyboard 42 while viewing a 3D stereoscopic image displayed on the display unit 142. FIG. 5 illustrates a specific example of the set plane and the regions. Here, for the purpose of simplicity, an example in which the coordinate space 6 is divided into two regions 61 and 62 by a plane (hereinafter also referred to as a "guide plane") 51 along a single coordinate axis X is illustrated.

The guide plane 51 is perpendicular to the coordinate axis X and divides the coordinate space 6 into the region 61 and the region 62 in an axis direction. The guide plane 51 is moved together with a mark figure 511 by moving the mark figure 511 provided at an intersection between the guide plane 51 and the coordinate axis X using the input device such as the mouse 41 or the keyboard 42. That is, when the mark figure 511 is moved along the coordinate axis on the basis of a signal input from the input unit 141, the guide plane 51 is moved in the coordinate space 6 in accordance with this and the position thereof is changed. Arrows in the figure indicate movement directions of the mark figure 511 along the coordinate axis X and movement directions of the guide plane 51 in the coordinate space 6.

More specifically, for example, when it is known that target cells indicate values equal to or larger than a certain value in a certain parameter, the mark figure 511 along the coordinate axis X representing the parameter is moved to the certain value. Next, the coordinate space 6 is divided into a region (a region in which figures 7 corresponding to the target cells exist) 62 equal to or larger than the certain value and a region (a region in which figures 7 corresponding to non-target cells exist) 61 smaller than the certain value using the guide plane 51 that moves in the coordinate space 6 in accordance with the movement of the mark figure 511.

In the 3D stereoscopic image, the guide plane 51 is displayed in a translucent manner, so that the user can observe the figures 7 (here, the figures 7 located in the region 62) observed behind the guide plane 51 when viewing stereoscopically. The user can recognize the figures 7 located behind the guide plane 51 through the translucent guide plane 51. Therefore, for example, when the figures 7 corresponding to the target cells and the figures 7 corresponding to the non-target cells are divided not using the values of a parameter but using an appropriate coordinate position according to a distribution situation, the user can set the position of the guide plane 51 while recognizing the distribution of the figures 7 in the direction of the coordinate axis X.

The guide plane 51 may be displayed in the 3D stereoscopic image only when a signal has been input from the input unit 141. In doing so, when setting the guide plane 51, the user can more properly recognize the figures 7 observed behind the guide plane 51. In addition, it is easy to see a coordinate axis observed behind the guide plane 51 and the scale and the values of the coordinate axis. It is to be noted that the same effect can be produced by enabling switching between display and non-display of the guide plane 51 in the 3D stereoscopic image on the basis of a signal input from the input unit 141 by the user. In this case, when the position of the guide plane 51 is to be adjusted, the user may display the guide plane 51 in the image, and when the position of the guide plane 51 after the setting and regions obtained as a result of the division by this are to be checked, the user does not display the guide plane 51 in the image.

The coordinate space 6 can be divided into two or more regions in accordance with data to be analyzed. The number of regions is not particularly limited, but it is preferable that a perpendicular guide plane is set for each coordinate axis and accordingly the coordinate space 6 is divided into eight regions. FIG. 6 illustrates a three-dimensional distribution graph in which the coordinate space 6 is divided into eight regions.

Guide planes 51, 52, and 53 are perpendicular to coordinate axes of X, Y, and Z, respectively, and the coordinate space 6 is divided into eight regions, namely regions 61 to 68, by these three guide planes. Among the eight regions, for example, the region 61 is a region whose value of a parameter represented by the X-axis is larger than a value at which the mark figure 511 is located, whose value of a parameter represented by the Y-axis is smaller than a value of a mark figure 521, and whose value of a parameter represented by the Z-axis is smaller than a value of a mark figure 531. In addition, for example, the region 68 is a region whose value of the parameter represented by the X-axis is smaller than the value at which the mark figure 511 is located, whose value of the parameter represented by the Y-axis is larger than the value of the mark figure 521, and whose value of the parameter represented by the Z-axis is larger than the value of the mark figure 531.

As described above, the positions of the guide planes 51, 52, and 53 can be changed by moving the mark figures 511, 521, and 531, respectively, provided at intersections with the coordinate axes (refer to FIG. 7(A)). Alternatively, as a mark figure for moving the guide planes 51, 52, and 53, a mark figure 541 may be provided at an intersection between the three planes (refer to FIG. 7(B)). In this case, by moving the mark figure 541, the positions of the guide planes 51, 52, and 53 can be collectively changed at the same time.

It is to be noted that although a case in which the guide planes are set as planes perpendicular to the coordinate axes has been described here, a guide plane may be set as an inclined plane that is not perpendicular to any coordinate axis (refer to FIG. 8). In this case, too, by moving mark figures provided at intersections between the guide plane and the coordinate axes, the position and the inclination of the guide plane can be changed.

4. Data Display

The data processing unit 120 calculates the values of the parameters and/or a distribution frequency in each region and causes the display unit 142 to display information (results of an analysis) regarding the values of the parameters and/or the distribution frequency.

The information regarding the values of the parameters may be the minimum values, the maximum values, the average values, the medians, the standard deviations, or the standard errors of the parameters of the figures 7 existing in the corresponding region or the like. In addition, the information regarding the distribution frequency is a ratio of the number of the figures 7 existing in the corresponding region to the number of the figures 7 existing in the entirety of the coordinate space 6. The distribution frequency is useful, for example, as population information indicating the percentage of target cells included in a cell population.

FIG. 9 illustrates an example of display of results of an analysis of the frequency distribution in a three-dimensional distribution graph in which the coordinate space 6 has been divided into eight regions. Here, an example will be described in which the first fluorescence (FL1), a third fluorescence (FL3), and a fifth fluorescence (FL5) are used as the parameters of the X-axis, the Y-axis, and the Z-axis, respectively, in the three-dimensional distribution graph 5 in which the regions 61 to 68 illustrated in FIG. 6 have been set.

In a table of the results of the analysis illustrated in the figure, for example, a row of FL1(+), FL3(−), and FL5(−) indicates a result (15.6%) of the analysis of the frequency distribution in the region 61, in which the measured value of FL1 is larger than the value at which the mark figure 511 is located, the measured value of FL3 is smaller than the value of the mark figure 521, and the measured value of FL5 is smaller than the value of the mark figure 531. In addition, for example, a row of FL1(−), FL3(+), and FL5(+) indicates a result (7.7%) of the analysis of the frequency distribution in the region 68, in which the measured value of FL1 is smaller than the value at which the mark figure 511 is located, the measured value of FL3 is larger than the value of the mark figure 521, and the measured value of FL5 is larger than the value of the mark figure 531.

The results of the analysis of the frequency distribution may be presented to the user by displaying the figures 7 in each region in a 3D stereoscopic image displayed on the display unit 142 in multicolor display using a color associated with the distribution frequency. Existing heat map display used to visualize frequency information may be applied to the association between the distribution frequency and the color of the figures 7.

FIG. 10 illustrates a three-dimensional distribution graph displayed in multicolor display that reflects the distribution frequency. A three-dimensional distribution graph illustrated in (A) is the same as the graph illustrated in FIG. 6 and has been divided into the regions 61 to 68 by the guide planes 51, 52, and 53, and the distribution frequency in each region is supposed to have been calculated as illustrated in FIG. 9. (B) is a diagram illustrating colors given to the figures 7 existing in the corresponding region in accordance with the value of the distribution frequency calculated in each region, and more intense colors are associated with higher distribution frequencies and paler colors are associated with lower distribution frequencies.

In the three-dimensional distribution graph illustrated in (A), the color of the figures 7 in a region in which the frequency distribution is high (the region 63 illustrated in FIG. 6 is the highest) is displayed in such a way as to be intense and the color of the figures in a region in which the frequency distribution is low (the region 67 illustrated in FIG. 6 is the lowest) is displayed in such a way as to be pale on the basis of the corresponding relationship between the distribution frequency and the colors illustrated in (B). Thus, by displaying the results of the analysis of the frequency distribution in the 3D stereoscopic image as the figures 7 in each region in a different color corresponding to the frequency distribution, the user can intuitively perceive the results of the analysis.

The association between the distribution frequency and the colors is not limited to the intensity of a single color as described here, and multicolor display using different brightness, chroma, or hue is possible. For example, as in the case of the existing heat map display, a method may be adopted in which as the distribution frequency becomes lower, the color changes from warm colors to cold colors, while using warm colors such as red in a region in which the distribution frequency is high, middle colors such as green in a region in which the distribution frequency is moderate, and cold colors such as blue in a region in which the distribution frequency is low.

The calculation of the values of the parameters and/or the distribution frequency in each region by the data processing unit 120 may be newly executed every time a change in the positions of the guide planes and resetting of the regions are made in synchronization with movement of the guide planes by the user using the input device. Furthermore, it is preferable that the color of the figures 7 in each region of the three-dimensional distribution graph is updated in such a way as to be colors corresponding to a newly calculated distribution frequency and the distribution frequency is reflected in the 3D stereoscopic image displayed on the display unit 142. Thus, by displaying results of an analysis of the distribution frequency in the 3D stereoscopic image in real time in response to a change in the positions of the guide planes and the resetting of the regions by the user, the user can perceive the results of the analysis more intuitively, which contributes to an improvement in the efficiency of the analysis of data.

In addition to the above-described method in which the color of the figures 7 in each region of the three-dimensional distribution graph is automatically changed in synchronization with a change in the positions of the guide planes and the resetting of the regions by the user, the user may change the color of the figures 7 at a desired timing after a change in the positions of the guide planes or the like, in order to make it possible to check results of an analysis of the distribution frequency. In this case, although all the figures 7 in the regions may be displayed in the same color during an operation for making a change in the positions of the guide planes and resetting the regions, it is preferable that the figures 7 are preferably displayed in a unique color in each region. For example, in the example of the three-dimensional distribution graph illustrated in FIG. 6 in which the coordinate space 6 is divided into eight regions, the figures 7 in the eight regions, namely the regions 61 to 68, are displayed in different unique colors. Thus, by displaying the figures 7 while providing a color unique to each region, the user can set the regions while checking in which region each figure 7 exists when the user is to make a change in the positions of the guide planes, and therefore it is possible to clearly recognize boundaries between the regions and to accurately make the setting of the regions. It is to be noted that after a change in the positions of the guide planes or the like is completed, it is preferable that the user changes the color of the figures 7 from the color unique to each region to a color that reflects the distribution frequency in each region at a desired timing, thereby making it possible to check results of an analysis of the distribution frequency.

Thus, in the 3D data analysis apparatus 1, the user can set the regions for a data analysis while stereoscopically viewing the three-dimensional distribution graph whose coordinate axes are the arbitrarily selected three types of parameters, and can obtain the values of variables and/or results of an analysis of the distribution frequencies in the regions. Therefore, in the 3D data analysis apparatus 1, it is possible to set a region in which only fine particles to be analyzed exist and obtain accurate results of the analysis even in the case of a sample with which the fine particles to be analyzed are difficult to identify using an existing histogram or cytogram whose coordinate axes are one type or two types of parameters. In addition, by displaying the three-dimensional distribution graph while arbitrarily combining parameters to be used for the coordinate axes, it is possible to obtain information relating to three characteristics of fine particles in one graph. Furthermore, by displaying 3D stereoscopic images obtained by observing the same three-dimensional distribution graph from a plurality of different directions or by displaying 3D stereoscopic images of a plurality of three-dimensional distribution graphs, in each of which at least one of the selected three types of parameters is different, a larger number of pieces of information can be obtained. Therefore, in the 3D data analysis apparatus 1, the number of graphs to be referred to can be decreased compared to an existing analysis using a histogram or a cytogram, and an efficient analysis can be performed.

5. Characteristics of 3D Stereoscopic Image

The characteristics of a 3D stereoscopic image displayed by the 3D data analysis apparatus according to the present technology will be sequentially described hereinafter.

(5-1) Shape of Figures

The figures corresponding to the fine particles denoted by the code 7 in FIG. 3 are calculated as polyhedrons configured by combinations between polygons having a certain shape and displayed in the 3D stereoscopic image. As described above, the data processing unit 120 calculates the positions of the fine particles in the coordinate space and the figures 7 on the basis of the measured values of the parameters selected by the user and creates a three-dimensional distribution graph. At this time, by calculating the figures 7 as polyhedrons configured by combinations between polygons having a certain shape, a calculation load upon the data processing unit 120 can be reduced. In addition, by displaying the figures 7 as the polyhedrons configured by the combinations between the polygons having the certain shape in the 3D stereoscopic image, the stereoscopic sense of the image can be enhanced when the image is stereoscopically viewed.

As a polyhedron configured by a combination between polygons having a certain shape, for example, a hexahedron configured by a combination between six triangular polygons, which is illustrated in FIG. 11(A), or an octahedron configured by a combination between eight polygons, which is illustrated in (B), may be adopted. The shape of the figures 7 is not particularly limited so long as the shape is a polyhedron configured by a combination between polygons having a certain shape, but a hexahedron or an octahedron is preferable in terms of reduction of the calculation load and the stereoscopic sense.

(5-2) Shading Process for Figures

In the 3D stereoscopic image, among the figures 7, figures observed closer when viewed stereoscopically are displayed in such a way as to be more intense, and figures that observed further are displayed in such a way as to be paler. Such a process for changing the intensity of the figures 7 will be referred to a "shading process" hereinafter.

A conceptual diagram of a stereoscopically observed image (hereinafter simply referred to as a "stereoscopic image") of the figures 7 subjected to the shading process is illustrated in FIG. 12. The figures 7 observed closer are more intense and the figures 7 observed further are paler in accordance with the direction of an arrow in the figure. Thus, by performing the shading process on the figures 7, depth is given to the stereoscopic image of the 3D stereoscopic image, thereby improving the stereoscopic sense.

A processing method of the shading process will be described with reference to FIG. 13. The image for the left eye and the image for the right eye are simultaneously displayed on the display 43, and an image for the left eye and an image for the right eye of a figure 70 observed at the position of a screen of the display 43 are displayed in an overlapped manner when viewed stereoscopically (refer to FIG. 13(B)).

When the image for the left eye displayed on the display 43 is on the right of the image for the right eye (refer to FIG. 13(A)), the figure is stereoscopically viewed closer than the position of the screen of the display 43. A stereoscopic image of the observed figure that protrudes from the position of the screen is denoted by a code 71 in the figure, the image for the left eye of the figure 71 displayed on the display 43 is denoted by a code 71L, and the image for the right eye is denoted by a code 71R. On the other hand, when the image for the left eye displayed on the display 43 is on the left of the image for the right eye (refer to FIG. 13(C)), the figure is stereoscopically viewed further than the position of the screen of the display 43. A stereoscopic image of the observed figure that protrudes from the position of the screen is denoted by a code 72, the image for the left eye of the figure 71 displayed on the display 43 is denoted by a code 72L, and the image for the right eye is denoted by a code 72R.

In the shading process, the image 71L for the left eye and the image 71R for the right eye of the figure 71 observed closer are displayed in such a way as to be more intense, and the image 72L for the left eye and the image 72R for the right eye of the figure 72 observed further are displayed in such a way as to be paler.

(5-3) Coordinate Axis

In the 3D stereoscopic image, a portion of a coordinate axis observed closer when viewed stereoscopically is displayed in such a way as to be thicker, and a portion observed further is displayed in such a way as to be thinner. A conceptual diagram of a stereoscopic image of a coordinate axis whose thickness has been changed is illustrated in FIG. 14. Thus, by changing the thickness of the coordinate axis, depth is given to the stereoscopic image of the 3D stereoscopic image, thereby improving the stereoscopic sense.

In addition, as illustrated in FIG. 14, by displaying a portion of scale intervals of the coordinate axis observed closer when viewed stereoscopically in such a way as to be larger and a portion observed further in such a way as to be smaller, depth is further given to the stereoscopic image. Alternatively, the same effect can be produced by displaying the characters of the name of the coordinate axis (SS-Lin in the figure) and the values of the scale (200, 400, 600, 800, and 1000 in the figure) in such a way as to be larger in a closer portion and smaller in a further portion. It is to be noted that a process for changing the thickness of the coordinate axis and the size of the scale intervals and the characters can be performed by applying the above-described shading process.

The coordinate axis may be a bi-exponential axis (refer to NPL 1) having characteristics in which a linear axis and a logarithmic axis are combined. Along the bi-exponential axis, the positions of the figures 7 corresponding to fine particles are calculated by applying a function whose main function element is a linear function to data in which the measured values of a parameter selected as the coordinate axis are smaller than a certain value. In addition, the positions of the figures 7 are calculated by applying a function whose main function element is a logarithmic function to data in which the measured values are larger than the certain value. More simply, in the bi-exponential axis, a region larger than a certain value may be a logarithmic axis and a region smaller than the certain value may be a linear axis. By using the bi-exponential axis as a coordinate axis of the three-dimensional distribution graph, display of a wide dynamic range utilizing the characteristics of the logarithmic axis is possible, and display of negative values is also possible because of the characteristics of the linear axis. It is to be noted that at least one of the coordinate axes of the three-dimensional distribution graph may be the bi-exponential axis.

(5-4) Moving Image

As described above, the display of a 3D stereoscopic image on the display unit 142 (the display 43) may be performed by arbitrarily rotating, enlarging, or reducing the 3D stereoscopic image on the basis of a signal input from the input unit 141 (the mouse 41, the keyboard 42, or the like) by the user. When the 3D stereoscopic image is to be rotated, as illustrated in FIG. 3, a coordinate axis is preferably displayed on each side of a solid figure (a cube in the figure) that configures the coordinate space 6. Because the solid figure of the coordinate space 6 is clarified by these coordinate axes, a change in the orientation of the three-dimensional distribution graph when the 3D stereoscopic image has been rotated becomes easy to recognize.

The 3D stereoscopic image displayed on the display 43 is arbitrarily rotated by an input from the user, or may constantly rotate slowly in a specific direction or in an unspecified direction, instead. By displaying the 3D stereoscopic image using a moving image that constantly rotates, the stereoscopic sense can be improved compared to the display using a still image.

Furthermore, the 3D stereoscopic image displayed on the display 43 is automatically rotated to an orientation in which an image stereoscopically observed from a coordinate axis direction selected by the user at an arbitrary timing during a rotation operation by the user or during automatic rotation on the basis of a signal input by the user is presented. FIG. 15 illustrates an image of a three-dimensional distribution graph stereoscopically observed from each coordinate axis direction. (A) illustrates an image observed from a Z-axis direction, (B) illustrates an image observed from an X-axis direction, and (C) illustrates an image observed from a Y-axis direction. The point of view may be switched from each coordinate axis direction by, for example, rotating the image to the point of view from the Z-axis direction through an input using a Z key of the keyboard 42 and by rotating the image from the point of view from the Z-axis direction to the point of view from the X-axis direction through an input using an X key. Alternatively, the point of view may be switched from each coordinate axis direction by, for example, clicking an icon displayed on the display 43 using the mouse 41. Thus, by making it possible to observe the 3D stereoscopic image while switching the point of view from each coordinate axis direction through a simple input, it becomes easier for the user to grasp the characteristic distribution of fine particles in the three-dimensional distribution graph.

It is to be noted that when the 3D stereoscopic image is displayed in such a way as to constantly rotate on the display 43, the 3D stereoscopic image preferably rotates in such a way as to maintain a vertical direction of the three-dimensional distribution graph. That is, the 3D stereoscopic image preferably rotates while a plane selected from among an XY plane, a YZ plane, and a ZX plane of the three-dimensional distribution graph is always located under the distribution graph. More specifically, for example, when the 3D stereoscopic image illustrated in FIG. 15(A) constantly rotates, the image is rotated such that the ZX plane is always located at a bottom surface of the three-dimensional distribution graph. At this time, the image may be rotated while inclining the rotational axis of the three-dimensional distribution graph or changing the inclination angle. Thus, when a certain restriction is put on the rotational direction of the 3D stereoscopic image, it is easier for the user to perceive the direction of his or her point of view relative to the three-dimensional distribution graph, thereby preventing the user from becoming unable to grasp the orientation of the three-dimensional distribution graph.

The 3D stereoscopic image displayed on the display 43 may be displayed using a moving image in which figures corresponding to fine particles vibrate. At this time, figures observed closer are displayed in such a way as to vibrate largely compared to figures observed further when viewed stereoscopically. A conceptual diagram of stereoscopic images of figures to which a vibrating action is added is illustrated in FIG. 16. As illustrated by arrows in the figure, figures 71 and 72 horizontally vibrate, and the width of the horizontal vibration is larger in the figure 71 observed closer and smaller in the figure 72 observed further. Thus, by displaying a figure observed closer in such a way as to vibrate largely compared to a figure observed further when viewed stereoscopically, depth is given to the stereoscopic image of the 3D stereoscopic image, thereby improving the stereoscopic sense.

Alternatively, when the 3D stereoscopic image is displayed using a moving image, figures corresponding to fine particles may flash on and off. At this time, by displaying a figure observed closer in such a way as to flash on and off frequently compared to a figure observed further when viewed stereoscopically, the stereoscopic sense of the 3D stereoscopic image can be further improved.

Furthermore, when the measurement data 32 includes measured values at a plurality of time points, the 3D stereoscopic image of a three-dimensional distribution graph at each time point may be displayed using a moving image. In doing so, for example, in the above-described example in which association or dissociation of a cell-surface molecular complex is measured, changes over time such as association of the cell-surface molecular complex can be checked using the moving images.

As described above, ideas are incorporated into the 3D data analysis apparatus according to the present technology in order to improve the stereoscopic sense of a 3D stereoscopic image to be displayed. Therefore, even in the case of a three-dimensional distribution graph composed of only dots (figures corresponding to fine particles) and lines (coordinate axes), the user can analyze measurement data while properly recognizing their stereoscopic images and can easily and intuitively identify fine particles and small fine particle populations to be analyzed in the distribution graph.

6. 3D Data Analysis Program

The 3D data analysis program according to the present technology causes a computer to execute a step of calculating positions and figures in a coordinate space whose coordinate axes are independent three types of variables selected from measurement data regarding fine particles and creating a 3D stereoscopic image representing characteristic distribution of the fine particles, a step of displaying the 3D stereoscopic image, and a step of displaying, in the 3D stereoscopic image, the figures in each region of the coordinate space divided into a plurality of regions by a plane set by a user in a different color in each region.

To describe the 3D data analysis program with reference to FIG. 1 and FIG. 2 again on the basis of the above-described embodiment, the 3D data analysis program is stored in or held by the hard disk 30 (refer to a code 31 in the figure). The 3D data analysis program is read by the memory 20 under the control of the CPU 10 and the operating system (OS) 33 and executes a process for creating a 3D stereoscopic image of a three-dimensional distribution graph in the data processing unit 120 and a process for displaying the 3D stereoscopic image on the display unit 142.

The 3D data analysis program may be one recorded on a computer-readable recording medium. There is no particular restriction insofar as the recording medium is a computer-readable recording medium, but, for example, a disk recording medium such as a flexible disk or a CD-ROM is used. Alternatively, a tape recording medium such as a magnetic tape may be used.

The 3D data analysis apparatus may have the following configurations.

(1) A 3D data analysis apparatus that includes a data storage unit which saves measurement data regarding fine particles, an input unit which selects independent three types of variables from the measurement data, a data processing unit which calculates positions and figures in a coordinate space whose coordinate axes are the three types of variables and which creates a 3D stereoscopic image representing characteristic distribution of the fine particles, and a display unit which displays the 3D stereoscopic image and that displays, in the 3D stereoscopic image, the figures in each region of the coordinate space divided into a plurality of regions by a plane in a different color in each region.

(2) The 3D data analysis apparatus according to (1), in which the data processing unit calculates a distribution frequency in each region and the display unit displays the figures in each region in a color associated with the distribution frequency.

(3) The 3D data analysis apparatus according to (1) or (2), in which the plane is set on the basis of a signal input from the input unit in such a way as to enable a change in a position and displayed in the 3D stereoscopic image.

(4) The 3D data analysis apparatus according to any of (1) to (3), in which the data processing unit calculates the distribution frequency in synchronization with the change in the position of the plane and the color of the figures in each region is displayed in such a way as to change in real time.

(5) The 3D data analysis apparatus according to any of (1) to (4), in which the 3D stereoscopic image is rotated on the display unit on the basis of a signal input from the input unit and a stereoscopic image of the image can be observed from an arbitrarily selected coordinate axis direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

INDUSTRIAL APPLICABILITY

According to the 3D data analysis apparatus according to the present technology, by setting regions for a data analysis while stereoscopically viewing a three-dimensional distribution graph whose coordinate axes are arbitrarily selected three types of parameters, accurate results of the analysis can be obtained from a sample with which it is difficult for an existing apparatus using a histogram or a cytogram to make an analysis. Therefore, the 3D data analysis apparatus according to the present technology can be used, for example, together with a flow cytometer and used to easily and accurately analyze the characteristics of cells and microorganisms in a medical field, a public health field, a drug development field, or the like.

REFERENCE SIGNS LIST 1 3D data analysis apparatus, 10 central processing unit, 110 control unit, 120 data processing unit, 130 data storage unit, 141 input unit, 142 display unit, 150 input/output interface, 2 flow cytometer, 20 memory, 210 control unit, 220 flow system, 230 detection system, 231 optical detection unit, 232 electrical detection unit, 240 sampling system, 250 input/output interface, 3 fine particle analysis system, 30 hard disk, 31 3D data analysis program, 32 measurement data, 33 operating system, 4 communication cable, 41 mouse, 42 keyboard, 43 display, 44 printer, 5 three-dimensional distribution graph, 51, 52, 53 guide plane, 511, 521, 531, 541 mark figure, 6 coordinate space, 61, 62, 63, 64, 65, 66, 67, 68 region, 7 figure, 8 shutter glasses

The invention claimed is:

1. A 3D data analysis apparatus comprising:
a data storage unit that saves measurement data regarding fine particles;
an input unit that selects independent three types of variables from the measurement data;
a data processing unit that calculates positions and figures in a coordinate space whose coordinate axes are the three types of variables and that creates a 3D stereoscopic image representing characteristic distribution of the fine particles; and a display unit that displays the 3D stereoscopic image, wherein, in the 3D stereoscopic image, the figures in the coordinate space are divided into a plurality of regions by a plane and the figures in each region are displayed in a different color, wherein the data processing unit is configured to calculate a distribution frequency for the figures in each region, wherein the display unit is configured to display the figures in each region in a color associated with the distribution frequency, wherein the plane is configured to be changed to a different position on the basis of a signal input from the input unit and the plane is displayed in the 3D stereoscopic image, wherein the data processing unit is configured to calculate the distribution frequency in synchronization with the change in the position of the plane, and wherein the color of the figures in each region is displayed in such a way as to change in real time.

2. The 3D data analysis apparatus according to claim 1, wherein the 3D stereoscopic image is rotated on the display unit on the basis of a signal input from the input unit and a stereoscopic image of the image can be observed from an arbitrarily selected coordinate axis direction.

3. A fine particle analysis system comprising:

a 3D data analysis apparatus that includes a data storage unit which saves measurement data regarding fine particles, an input unit which selects independent three types of variables from the measurement data, a data processing unit which calculates positions and figures in a coordinate space whose coordinate axes are the three types of variables and which creates a 3D stereoscopic image representing characteristic distribution of the fine particles, and a display unit which displays the 3D stereoscopic image and that displays, in the 3D stereoscopic image, the figures in the coordinate space are divided into a plurality of regions by a plane in a different color in each region; and a fine particle measuring apparatus, wherein the data processing unit is configured to calculate a distribution frequency for the figures in each region, wherein the display unit is configured to display the figures in each region in a color associated with the distribution frequency, wherein the plane is configured to be changed to a different position on the basis of a signal input from the input unit and the plane is displayed in the 3D stereoscopic image, wherein the data processing unit is configured to calculate the distribution frequency in synchronization with the change in the position of the plane, and wherein the color of the figures in each region is displayed in such a way as to change in real time.

4. The fine particle analysis system according to claim 3, wherein the 3D stereoscopic image is rotated on the display unit on the basis of a signal input from the input unit and a stereoscopic image of the image can be observed from an arbitrarily selected coordinate axis direction.

5. A 3D data analysis method comprising:

a procedure for selecting independent three types of variables from measurement data regarding fine particles;

a procedure for calculating positions and figures in a coordinate space whose coordinate axes are the three types of variables and creating a 3D stereoscopic image representing characteristic distribution of the fine particles by a data processing unit;

a procedure for displaying the 3D stereoscopic image by a display unit;

a procedure for setting a plane that divides the coordinate space into a plurality of regions in the 3D stereoscopic image; and a procedure for displaying the figures in each region in a different color in each region, wherein the data processing unit is configured to calculate a distribution frequency for the figures in each region, wherein the display unit is configured to display the figures in each region in a color associated with the distribution frequency, wherein the plane is configured to be changed to a different position on the basis of a signal input from the input unit and the plane is displayed in the 3D stereoscopic image, wherein the data processing unit is configured to calculate the distribution frequency in synchronization with the change in the position of the plane, and wherein the color of the figures in each region is displayed in such a way as to change in real time.

6. The 3D data analysis method according to claim 5, wherein the 3D stereoscopic image is rotated on the display unit on the basis of a signal input from the input unit and a stereoscopic image of the image can be observed from an arbitrarily selected coordinate axis direction.

7. A non-transitory computer-readable medium having a 3D data analysis program that causes a computer to execute:

a step of calculating positions and figures in a coordinate space whose coordinate axes are independent three types of variables selected from measurement data regarding fine particles and creating a 3D stereoscopic image representing characteristic distribution of the fine particles by a data processing unit;

a step of displaying the 3D stereoscopic image by a display unit; and a step of displaying, in the 3D stereoscopic image, the figures in the coordinate space are divided into a plurality of regions by a plane set by a user in a different color in each region, wherein the data processing unit is configured to calculate a distribution frequency for the figures in each region, wherein the display unit is configured to display the figures in each region in a color associated with the distribution frequency wherein the plane is configured to be changed to a different position on the basis of a signal input from the input unit and the plane is displayed in the 3D stereoscopic image, wherein the data processing unit is configured to calculate the distribution frequency in synchronization with the change in the position of the plane, and wherein the color of the figures in each region is displayed in such a way as to change in real time.

8. The non-transitory computer-readable medium according to claim 7, wherein the 3D stereoscopic image is rotated on the display unit on the basis of a signal input from the input unit and a stereoscopic image of the image can be observed from an arbitrarily selected coordinate axis direction.

\* \* \* \* \*